March 22, 1949. F. L. VAN WEENEN ET AL 2,465,139
HOT GAS ENGINE WITH PHASE CHANGER
Filed Aug. 31, 1945
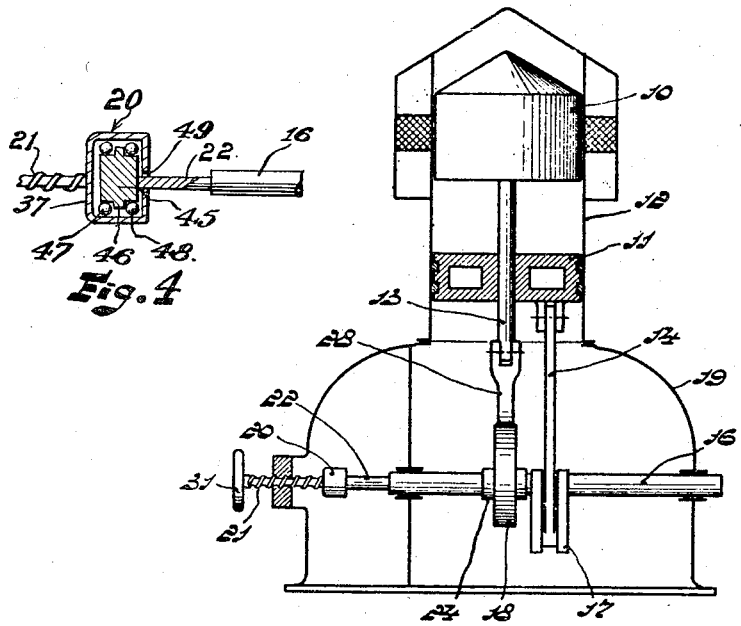
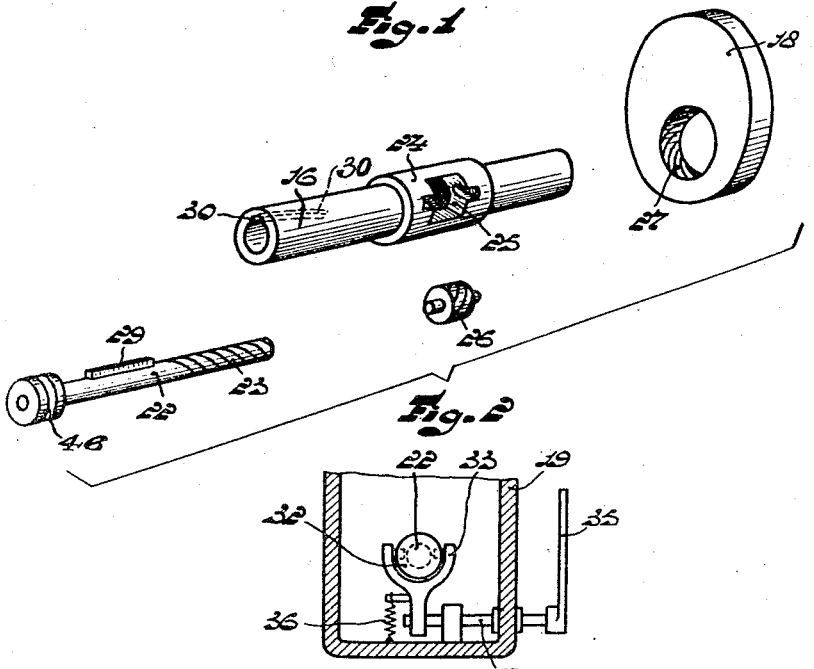
INVENTORS
FRANCISCUS LAMBERTUS VAN WEENEN &
WILLEM HENDRIK STIGTER
BY *S. F. Wenderoth*
ATTORNEY Patented Mar. 22, 1949

2,465,139

UNITED STATES PATENT OFFICE 2,465,139

HOT GAS ENGINE WITH PHASE CHANGER

Franciscus Lambertus Van Weenen and Willem Hendrik Stigter, Eindhoven, Netherlands, assignors to Hartford National Bank & Trust Co., Hartford, Conn., as trustee Application August 31, 1945, Serial No. 613,946
In the Netherlands April 6, 1943

Section 1, Public Law 690, August 8, 1946
Patent expires April 6, 1963

6 Claims. (Cl. 60—24)

This invention relates to a hot-gas motor and more particularly to a device for changing the indicated power of the same by adjusting the phase angle between the motor piston and its expeller through the use of eccentric means.

Changing this angle has the effect of modifying the highest and the lowest pressures in the cycle of operations so that the indicated power increases or decreases. A well-known device for changing this phase angle is formed by the known link mechanism used in steam engines. A disadvantage involved in this construction is that the mass of this mechanism has to reciprocate to an appreciable extent.

A principal object of this invention is to provide means in a hot-gas motor for varying the power output of the same without employing cumbrous reciprocating masses.

Other objects, features and advantages of this invention will become apparent as the description of the same proceeds hereinafter.

In the drawing:

Fig. 1 is a vertical schematic view of a hot-gas motor showing one embodiment of the mechanism for adjusting the phase angle between the motor piston and its expeller through an eccentric and for changing the direction of motor rotation, some parts of the motor being shown in sections.

Fig. 2 is a perspective view of various essential parts of the subject mechanism shown in an exploded arrangement, the gearing on the various elements being shown diagrammatically; and Fig. 3 is an end view of another embodiment of a shifting mechanism or adjusting movement shown in Fig. 1.

Figure 4 is an enlarged view of the conventional ball bearing device 20 shown in Figure 1 with parts broken away to show the internal structure.

According to the present invention, the expeller is driven from the piston crank shaft by means of an eccentric and the point of application of this eccentric is located on a rod arranged inside the hollow crank shaft, said rod being provided with a deformation forming an angle with its centre line and cooperating with a deformation in the eccentric. In the construction according to the invention shifting of the point of application of this rod along the periphery of the crank shaft is effected by simply displacing the rod in the hollow crank shaft, either by simple displacement of the point of application along this rod or by a combination of this displacement with a partial given rotation of this rod so that the desired phase angle between piston and expeller drive can thus be adjusted.

Though it is possible to secure this eccentric direct to the said rod arranged internally of the hollow crank shaft, for instance by the use of an overhanging eccentric which is external to the crank shaft or by removing a considerable part of the periphery of the crank shaft, it is, in general, advisable to use a construction in which the eccentric can also be secured in position at other points of the crank shaft. Large apertures in the crank shaft should be avoided to prevent it from being weakened.

In one embodiment of the invention the shell of the hollow crank shaft has arranged in it an intermediate wheel which on one side engages the eccentric and on the other side the rod in the crank shaft. This construction requires that an aperture be placed in the crank shaft only locally, whilst at the same time a complete revolution of the eccentric around the crank shaft remains possible.

In order that the invention may be clearly understood and readily carried into effect, it will now be described more fully with reference to the accompanying drawing in which is illustrated one embodiment of the invention.

Referring to the Figure 1, 10 designates the expeller and 11 the piston of a hot gas engine, the two of which reciprocate in an operating cylinder 12 with a given phase-difference. The piston 11 is coupled to a connecting rod 14 which, by means of a crank 17, transmits the driving power to the crank shaft 16. The drive for the expeller 10 is obtained from this same crank shaft 16. To this end this crank shaft has seated on it an eccentric 18 which is engaged by an eccentric rod 28, which engages the expeller 10 through the intermediary of the expeller rod 13.

The crank shaft 16, as shown in Figure 2, is hollow from the region on which the eccentric disc 18 is mounted, to the left end of the shaft, as viewed in Figures 1 and 2. This cavity receives a rod 22 readily fitting it which with the aid of an inserting key 29 is adapted to slide in the crank shaft in the direction of the centre line and which is prevented by the said key from rotating relatively to the crank shaft. That part of the rod 22 which is located in the proximity of the eccentric disc 18 is provided with a helical gearing 23 having an inclination of approximately 45°. The need for the inclination of approximately 45° will become apparent hereinafter. At the same spot, the crank shaft 16 is locally thickened and provided with a fitting surface 24, which fits the inner opening 27 of the eccentric 18 exactly. In this thickened part of the crank shaft 16 an aperture 25 is recessed in the shell of the crank shaft. This aperture has arranged in it a small gear wheel 26 which is also provided with helical gearing, whilst the inner side of the opening 27 of the eccentric 18 is likewise provided with a corresponding helical gearing. In addition, the gear wheel 26 meshes with the gearing 23 on the rod 22.

Shifting of the rod 22 in the direction of the centre line of the crank shaft consequently results in a rotation of the gear wheel 26 so that the eccentric 18 revolves on the crank shaft. It will be apparent that if the inclination of gearing 23 on rod 22 were less than 45°, it would take a large axial force applied to rod 22 to result in rotation of gearing 26 due to the friction encountered between the two gearings and to the fact that the greater component of force applied to gearing 26 would be axial thereof rather than tangential. Gearing 26 must then conform with gearing 23 and in turn, gearing 27 must conform with gearing 26. Hence the need for helical gearing throughout the system. On completion of the shifting of the rod 22, the eccentric is also stationary relatively to the crank shaft. The driving power for the eccentric is transmitted from the crank shaft 16 through the key-way 30 and the key 29 to the gearing 23. If this key-way 30, as the case may be, extends helically in the hollow crank shaft 16, the shifting of the rod 22 results in addition in producing rotation of this rod and this rotation further increases the displacement of the point of application on the gearing 23. Through the intermediary of the gear wheel 26 the eccentric 18 engages the rod 22. When the engine is in normal use and hence the rod 22 does not shift relatively to the crank shaft 16, the eccentric 18 will always occupy a determined position relatively to this crank shaft. In this case the entire adjusting mechanism, consisting of the rod 22 and the gear wheel 26 remains at rest relatively to the crank shaft, so that there are no reciprocating masses. In order to enable adjustment from without the motor during operation the part of the rod 22 which projects beyond the crank shaft may be provided with a double ball bearing 20 engaged by the end of a screw spindle 21. The conventional double ball bearing 20, as best seen in Figure 4, is of a known construction comprising a solid generally cylindrically shaped element 45 rigidly secured to rod 22 for movement therewith and housed in housing 37 which is rigidly secured to screw spindle 21. Housing 37 has an aperture 49 through which rod 22 extends. The element 45 has a circumferential thickening 46 thereon which acts as a separator for the two sets of races of ball bearings 47 and 48 on which housing 37 rides in relation to element 45. In this way, the rod 22 is therefore connected to the screw spindle so as to be in rotational relationship therewith, but not so as to be in longitudinally shiftable relationship therewith. The screw spindle 21 is guided in the wall of the crank case 19 and extends outwardly through this wall. Rotation of the screw spindle 21 results in shifting of the rod in the crank shaft 16 so the desired adjustment ensues. The screw spindle is externally provided with a device to turn the spindle at will. Such a device may be formed for example, by a simple handwheel 31, if there is only need for manual adjustment.

The rod 22 which is slidable in the crank shaft 18 for performing the adjustment is subjected to a force in the direction of the centre line of the crank shaft. The force which the crank shaft exerts on the eccentric 18 when the expeller does positive work has a component along the rod 22 owing to the helical gearing 23. If the hot gas motor concerned is designed for a single direction of rotation or substantially for one direction of rotation only, as in the case for instance of marine engines, this force can be compensated by the provision of a counter-force. When using motors having a closed crank case 19 in which a fixed pressure above or below atmospheric pressure prevails this difference in pressure may be made available for compensating the force on the rod 22. In the case of an excessive pressure the direction of the gearing 23 is chosen to be such that with the direction of rotation most frequently used the rod 22 tends to slide inwards. In this case the angle between the gearing and the centre line may be chosen in accordance with other structural considerations; the diameter of the screw spindle 21 is then fixed in connection with the prevailing difference in pressure in such manner that the forces on the rod 22 balance one another. In those cases in which the most frequent direction of rotation can not be told beforehand, the influence of the difference in pressure inside and outside the crank shaft case on the adjusting force is preferably excluded by the use of the construction shown in Fig. 3, the rod 22 being housed entirely in a closed case. The adjusting movement is led to the outside by means of a fork 33 and a rotary shaft 34 on a lever 35. This fork 33 engages a collar 32 of the shaft 22. The adjustment shaft 34 only executes a rotary movement through the wall 19 of the crank shaft case and this movement is not affected by the prevailing difference in pressure. The remaining force on the shaft 22 as a result of the component of the gear wheel pressure on the helical gearing 23 can be eliminated by the provision of one or more springs that may be combined with cams and rollers. In certain cases the force on the expeller is so directed that it tends to produce a zero phase difference with the piston, that is to say a position in which no work is performed.

The rod 22 will consequently tend to slide from an advanced as well as from a backward position to a given mid-position. The adjusting force can be compensated in this case by providing the fork 33 with a spring 36 which urges the fork to either side out of the mid-position.

The device described above for the adjustment of the phase angle between piston and expeller may finally also be used for starting the motor. On the expeller being displaced when the piston is stationary, a movement of the gaseous medium in the motor occurs, by which the thermal cycle is introduced.

What we claim is:

1. A hot-gas motor comprising a piston, an expeller, a partially hollow crankshaft, rod means coupling said piston to said shaft, gear means retained within the hollow part of said shaft, internally geared eccentric means adjustably coupled to said shaft through said gear means, means coupling said eccentric means to said expeller and means for motivating said gear means.

2. A hot-gas motor comprising aligned piston means, crankshaft means having a smooth raised portion and a hollow portion and including a plurality of parallel bearings interposed by a recess, one of which bearings is longitudinally interiorly of said shaft means, others of which are located in said smooth raised portion, gearwheel means seated in the latter bearings and turnable within said recess, eccentric means having a crankshaft hole with deformations therein, said eccentric means being fitted over said raised portion with said gear means engaging said deformations, rod means having deformations at one end slidably fitted in said one of said bearings for engagement with said gearwheel means, means coupling said piston means to said crankshaft means and to said eccentric means, and means for moving said rod means in two directions only.

3. A hot-gas motor as claimed in claim 2 wherein a crank case for said motor sealably encloses said eccentric means and its allied parts.

4. A hot-gas motor as claimed in claim 2 wherein a crank case encloses said eccentric means, crankshaft means, rod means and other aligned parts in a sealable manner, said rod means being engaged by a spring retained screw spindle motivated exteriorly of said case, said spring acting as a compensator of forces which may be directed transversely of said eccentric means.

5. In a hot-gas motor having a plurality of piston means and connecting rods, a device for changing the phase angle relationship between said piston means, comprising a crankshaft with an enlarged section, a longitudinal and centralized bearing within one end of said crankshaft, said enlarged section containing a localized recess mating with an interior end of said centralized bearing, intermediate bearings parallel with said centralized bearing and contiguous with the body of said recess, a helically threaded rod fitted into said centralized bearing, eccentric means having a helically threaded crankshaft hole, an intermediate gearwheel seated in said intermediate bearings and interposed between the body of said eccentric and said threaded rod, means coupling said eccentric to one of said piston means, and means for moving said threaded rod in two longitudinal directions only.

6. A device as claimed in claim 5 enclosed in a crank case of said motor, wherein a spring retained hand motivated spindle is slidably interposed between an outer end of said threaded rod and said crank case, the tension of said spring being such as to eliminate the forces exerted by the expeller on said threaded rod in the longitudinal direction of this rod.

FRANCISCUS LAMBERTUS VAN WEENEN.
WILLEM HENDRIK STIGTER.

REFERENCES CITED

The following references are of record in the file of this patent:

UNITED STATES PATENTS

| Number | Name | Date |
|---|---|---|
| 537,517 | Anderson | Apr. 16, 1895 |
| 1,262,817 | McCreary | Apr. 16, 1918 |

FOREIGN PATENTS

| Number | Country | Date |
|---|---|---|
| 19,282 | Great Britain | Sept. 2, 1902 |
| 147,755 | Germany | Jan. 29, 1904 |
| 58,812 | Netherlands | Dec. 17, 1946 |